United States Patent
Tanaka et al.

(10) Patent No.: US 12,498,726 B2
(45) Date of Patent: Dec. 16, 2025

(54) METHOD FOR CONTROLLING MOBILE SHOP AND DEVICE FOR CONTROLLING MOBILE SHOP

(71) Applicant: TOYOTA JIDOSHA KABUSHIKI KAISHA, Toyota (JP)

(72) Inventors: Yurika Tanaka, Yokosuka (JP); Makoto Kakuchi, Toyota (JP); Daisuke Tsutsumi, Nagoya (JP); Kazuya Tsuchiya, Toyota (JP); Hiroaki Sugiyama, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 196 days.

(21) Appl. No.: 18/475,828

(22) Filed: Sep. 27, 2023

(65) Prior Publication Data

US 2024/0103524 A1  Mar. 28, 2024

(30) Foreign Application Priority Data

Sep. 28, 2022 (JP) ................ 2022-155315

(51) Int. Cl.
*G05D 1/00* (2024.01)
*B60L 58/12* (2019.01)

(52) U.S. Cl.
CPC ............ *G05D 1/0225* (2013.01); *B60L 58/12* (2019.02); *B60L 2200/36* (2013.01); *B60L 2270/00* (2013.01)

(58) Field of Classification Search
None
See application file for complete search history.

(56) References Cited

U.S. PATENT DOCUMENTS

2018/0260778 A1* 9/2018 Mazetti ............. G06Q 10/0875
2019/0121366 A1  4/2019 Yourou et al.
2022/0048186 A1* 2/2022 Sharma ............. G06F 11/3006

FOREIGN PATENT DOCUMENTS

JP         6279272 B2 * 2/2018
JP         2019-075038 A  5/2019

* cited by examiner

*Primary Examiner* — Hitesh Patel
*Assistant Examiner* — Wenyuan Yang
(74) *Attorney, Agent, or Firm* — Finnegan, Henderson, Farabow, Garrett and Dunner, LLP

(57) ABSTRACT

A method for controlling a mobile shop includes: determining a selling situation of a plurality of items using information about an inventory status of the plurality of items and information about a well-selling time of the plurality of items; setting a charging schedule for a battery (secondary battery) based on the selling situation; and causing the mobile shop to move to EVSE (charging facility) according to the charging schedule.

6 Claims, 4 Drawing Sheets

METHOD FOR CONTROLLING MOBILE SHOP AND DEVICE FOR CONTROLLING MOBILE SHOP

CROSS REFERENCE TO RELATED APPLICATIONS

This nonprovisional application is based on Japanese Patent Application No. 2022-155315 filed on Sep. 28, 2022 with the Japan Patent Office, the entire contents of which are hereby incorporated by reference.

BACKGROUND

Field

The present disclosure relates to a method for controlling a mobile shop and a device for controlling a mobile shop.

Description of the Background Art

Japanese Patent Laying-Open No. 2019-075038 discloses a system that allows one to apply for the use of a vehicle to thereby receive predetermined services in the vehicle. Japanese Patent Laying-Open No. 2019-075038 discloses that the vehicle is charged by a power supply facility provided in a parking lot when the SOC of the vehicle decreases.

SUMMARY

In the system described in Japanese Patent Laying-Open No. 2019-075038, however, when selling items and the like in the vehicle, the vehicle may be charged at a timing when, for example, the items are selling well. This may result in a decrease in sales of the items in the vehicle. Thus, it is desired to suppress a decrease in sales of items in an electrically powered vehicle (mobile shop) due to the timing of charging.

The present disclosure was made to solve such a problem, and has an object to provide a method for controlling a mobile shop and a device for controlling a mobile shop, that are capable of suppressing a decrease in sales of items due to the timing of charging.

A method for controlling a mobile shop according to a first aspect of the present disclosure is a method for controlling a mobile shop, the mobile shop having an electrically powered drive source and a secondary battery that supplies electric power to the drive source, and including a plurality of items, the method including: determining a selling situation of the plurality of items using at least one of information about an inventory status of the plurality of items and information about a well-selling time of the plurality of items; setting a charging schedule for the secondary battery based on the selling situation; and causing the mobile shop to move to a charging facility according to the charging schedule.

In the method for controlling a mobile shop according to the first aspect of the present disclosure, the charging schedule for the secondary battery is set based on the selling situation which is determined using at least one of the information about an inventory status of the plurality of items and the information about a well-selling time of the plurality of items, as described above. In this way, the charging schedule for the secondary battery can be adjusted depending on the inventory and the well-selling time of the items. As a result, charging of the vehicle can be suppressed at a timing when, for example, the items are selling well. In this way, a decrease in sales of the items due to the timing of charging can be suppressed.

In the method for controlling a mobile shop according to the first aspect, preferably, the determining includes determining whether or not the mobile shop is busy based on the selling situation. The setting includes setting, when it is determined that the mobile shop is busy, the charging schedule such that the secondary battery is not charged until an SOC of the secondary battery becomes less than a predetermined threshold value. With such a configuration, the moving of the mobile shop to the charging facility for the charging of the secondary battery can be suppressed when the mobile shop is busy (when the sales of the items are expected to increase).

In the method for controlling a mobile shop according to the first aspect, preferably, the determining includes determining the selling situation using information on an inventory quantity of the plurality of items. The causing includes causing the mobile shop to move to the charging facility when the inventory quantity becomes less than a predetermined quantity. With such a configuration, the mobile shop can be moved to the charging facility before the plurality of items are out of stock. As a result, the occurrence of a period during which the plurality of items are out of stock can be suppressed. In this way, the decrease in sales of the items can be further suppressed.

In the method for controlling a mobile shop according to the first aspect, preferably, the determining includes estimating a well-selling time of the plurality of items using information on current sales of the plurality of items. With such a configuration, the charging schedule for the secondary battery can be set based on the current sales of the plurality of items. As a result, the charging of the secondary battery can be completed in a time period during which, for example, the sales of the items tend to decline.

In the method for controlling a mobile shop according to the first aspect, preferably, the determining includes estimating a well-selling time of the plurality of items using history information on previous sales of the plurality of items. With such a configuration, a time period suitable for the charging of the secondary battery can be readily predicted based on the history information. As a result, a decrease in sales of the items due to the charging of the secondary battery can be readily suppressed.

In the method for controlling a mobile shop according to the first aspect, preferably, the setting includes setting the charging schedule using, in addition to the selling situation, information on air temperature at a destination of the mobile shop. Here, power consumption of the secondary battery varies depending on the air temperature. By setting the charging schedule using the information on air temperature, therefore, an extreme decrease in the SOC of the secondary battery and excessive charging of the secondary battery can be suppressed.

A device for controlling a mobile shop according to a second aspect of the present disclosure is a device for controlling a mobile shop, the mobile shop having an electrically powered drive source and a secondary battery that supplies electric power to the drive source, and including a plurality of items, the device including: an acquisition unit that acquires at least one of information about an inventory status of the plurality of items and information about a well-selling time of the plurality of items; and a control unit that controls the mobile shop. The control unit performs control of determining a selling situation of the plurality of items using the at least one of the information about an inventory status of the plurality of items and the information about a well-selling time of the plurality of items, setting a charging schedule for the secondary battery based on the selling situation; and causing the mobile shop to move to a charging facility according to the charging schedule.

In the device for controlling a mobile shop according to the second aspect of the present disclosure, the charging schedule for the secondary battery is set based on the selling situation which is determined using at least one of the information about an inventory status of the plurality of items and the information about a well-selling time of the plurality of items, as described above. In this way, a device for controlling a mobile shop capable of suppressing a decrease in sales of items due to the timing of charging can be provided.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
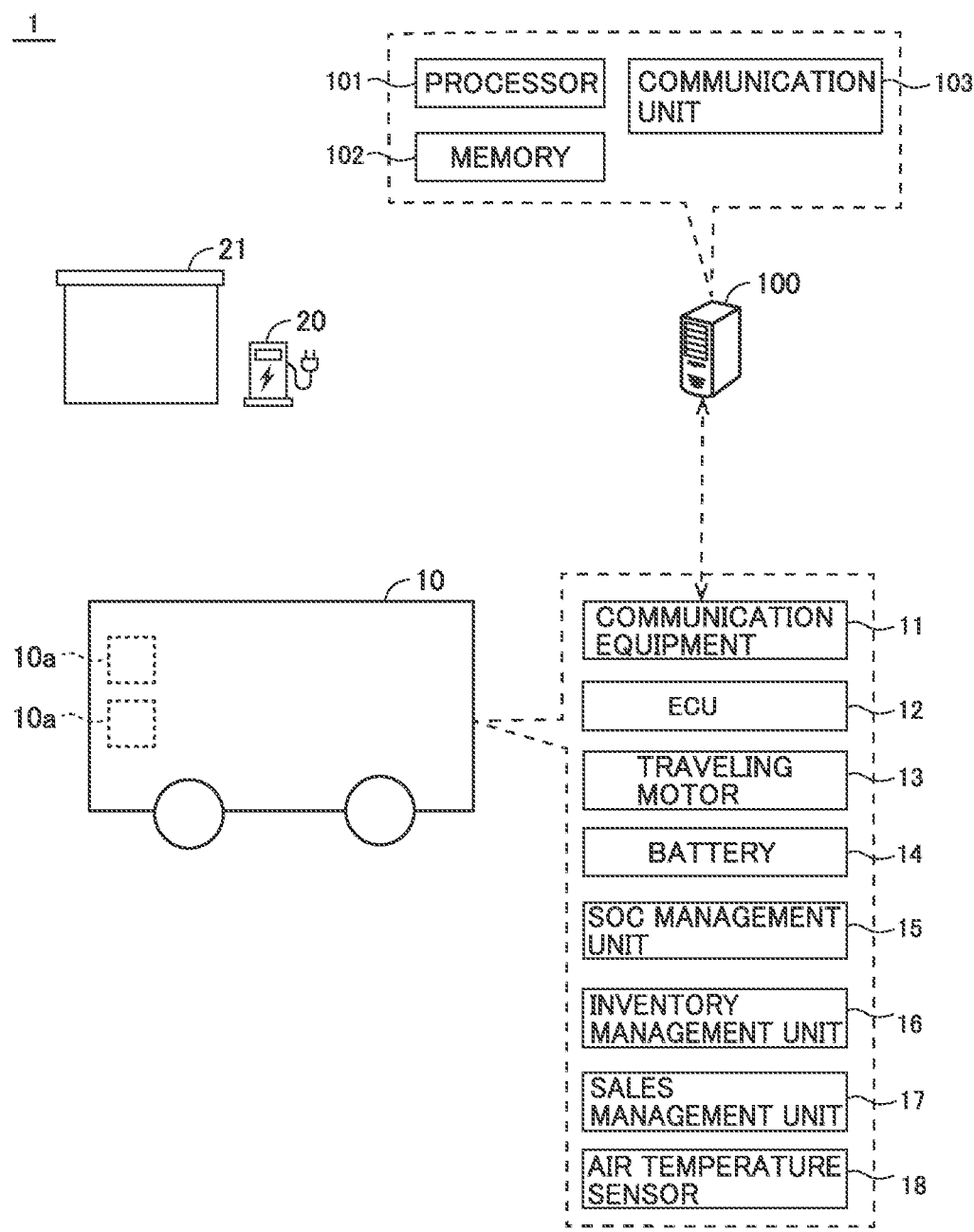
FIG. 1 shows a configuration of a control system according to one embodiment.

An embodiment of the present disclosure will be described in detail below with reference to the drawings. The same or corresponding portions in the drawings are denoted by the same reference characters and description thereof will not be repeated.

FIG. 1 shows a configuration of a control system 1 according to the present embodiment. Control system 1 includes a server 100, a mobile shop 10, and electric vehicle supply equipment (EVSE) 20. Note that server 100 is one example of "control device" of the present disclosure.

Mobile shop 10 includes a plurality of items 10a. The plurality of items 10a may include a plurality of types of items. Mobile shop 10 travels a predetermined travel route while selling the plurality of items 10a. Note that mobile shop 10 may sell electric power stored in a battery 14 to be described later, when items 10a run out of stock.

Mobile shop 10 also includes communication equipment 11, an electric control unit (ECU) 12, a traveling motor 13, battery 14, a state of charge (SOC) management unit 15, an inventory management unit 16, a sales management unit 17, and an air temperature sensor 18. Note that traveling motor 13 and battery 14 are examples of "electrically powered drive source" and "secondary battery" of the present disclosure, respectively.

Communication equipment 11 communicates with a communication unit 103 (to be described later) of server 100. Communication equipment 11 may include a data communication module (DCM), or a 5G (fifth-generation mobile communications system)-enabled communication I/F. ECU 12 controls electronic equipment (electronic system) in mobile shop 10. Battery 14 supplies electric power to traveling motor 13. Note that the electric power of battery 14 is also used to operate various types of electrical equipment in mobile shop 10.

SOC management unit 15 manages an SOC of battery 14. Inventory management unit 16 manages an inventory quantity of items 10a in mobile shop 10. Sales management unit 17 manages sales (number of sales) of items 10a. Air temperature sensor 18 measures an outside air temperature.

Battery 14 is charged when mobile shop 10 is electrically connected to EVSE 20. EVSE 20 is provided in a shopping mall 21, for example. Note that EVSE 20 may be provided in a location other than shopping mall 21 (for example, in a parking lot). Mobile shop 10 charges battery 14 by moving (returning) to EVSE 20 according to a charging schedule to be described later. Note that mobile shop 10 may be replenished with items 10a at the timing when battery 14 is charged.

Server 100 includes a processor 101, a memory 102, and communication unit 103. Processor 101 controls communication unit 103. Memory 102 stores, in addition to programs executed by processor 101, information (for example, maps, mathematical formulas, and various parameters) for use in the programs. Communication unit 103 includes various communication I/Fs. Note that processor 101 and communication unit 103 are examples of "control unit" and "acquisition unit" of the present disclosure, respectively.

Communication unit 103 receives information on the SOC of mobile shop 10 that is managed by SOC management unit 15. Communication unit 103 also receives information on the inventory quantity of items 10a in mobile shop 10 that is managed by inventory management unit 16. Note that the information on the inventory quantity is one example of "information about an inventory status" of the present disclosure.

Communication unit 103 also receives information on the sales (number of sales) of items 10a that are managed by sales management unit 17. Note that the information on the sales is one example of "information about a well-selling time" of the present disclosure.

Communication unit 103 also receives information on the outside air temperature measured by air temperature sensor 18. Note that the information on the outside air temperature is one example of "information on air temperature at a destination" of the present disclosure.

Processor 101 determines a selling situation of the plurality of items 10a using the information on the inventory quantity of the plurality of items 10a and the information on the sales of the plurality of items 10a.

Here, in a conventional system, a vehicle (battery) is not charged in consideration of a selling situation of items. This may result in a decrease in sales of items depending on the timing of charging. Thus, it is desired to suppress the decrease in sales of items due to the timing of charging.

In the present embodiment, processor 101 sets a charging schedule for battery 14 based on the selling situation.

Figure 2:
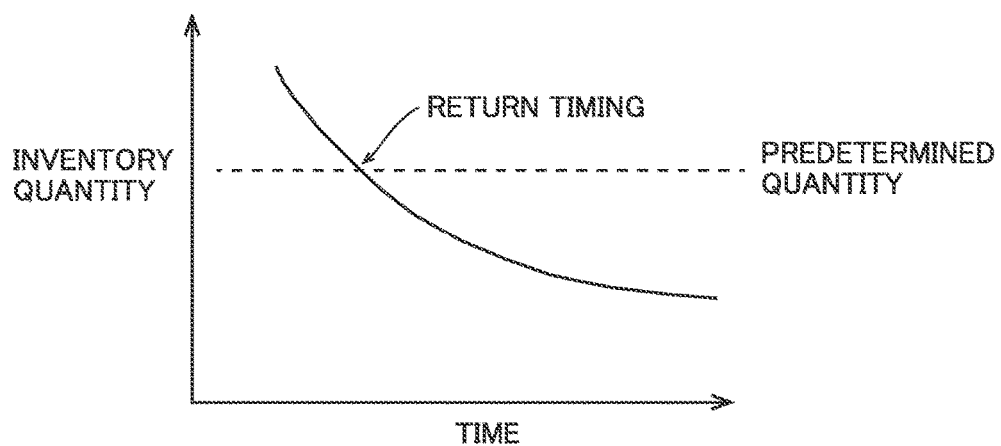
FIG. 2 shows a relationship between an inventory quantity of items and timing of return of a mobile shop.

Specifically, as shown in FIG. 2, processor 101 sets the timing of charging battery 14 to a timing when the inventory quantity of items 10a becomes less than a predetermined quantity (threshold quantity). For example, processor 101 commands mobile shop 10 to return to EVSE 20 based on the total inventory number in mobile shop 10 becoming less than the predetermined quantity. Note that different threshold quantities may be provided for different types of items 10a. In this case, the return to EVSE 20 is commanded when the inventory quantity of any one type of item 10a falls below the threshold quantity.

The threshold quantity is a predetermined fixed value, for example. Note that the threshold quantity may be a number corresponding to a predetermined percentage (for example, 50%) of an initial value of the inventory quantity of items 10a in mobile shop 10 (total number of items that can be loaded). The threshold quantity may vary over time. For example, the threshold quantity may decrease toward the end of business hours.

Figure 3:
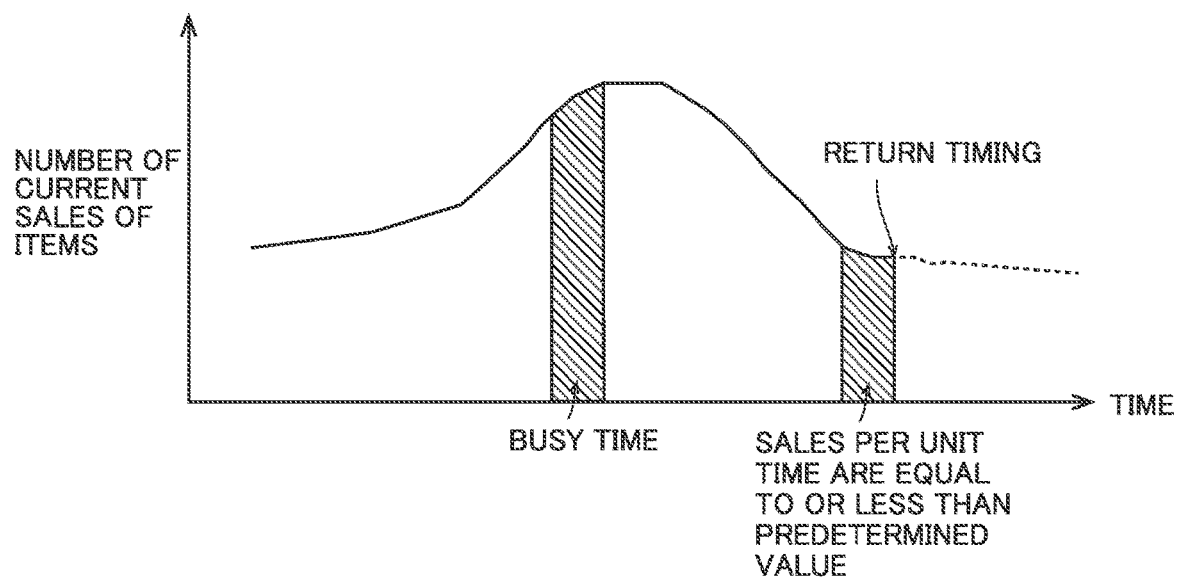
FIG. 3 shows a relationship between a number of current sales of items and timing of return of the mobile shop.

Processor 101 also estimates a well-selling time of the plurality of items 10a using information on current sales of the plurality of items 10a. Specifically, server 100 (processor 101) acquires, through communication unit 103, data on the sales of items 10a (FIG. 3) generated by sales management unit 17 of mobile shop 10. The data shown in FIG. 3 is data indicating a progression of the number of sales of items 10a on the current business day.

When the most recent number of sales of items 10a per unit time (see the shaded area in FIG. 3) falls below a predetermined value, for example, processor 101 determines that the sales of items 10a have declined, and that now is not a well-selling time of items 10a. In this case, processor 101 determines that now is a timing suitable for the charging of battery 14, and commands mobile shop 10 to return to EVSE 20.

Figure 4:
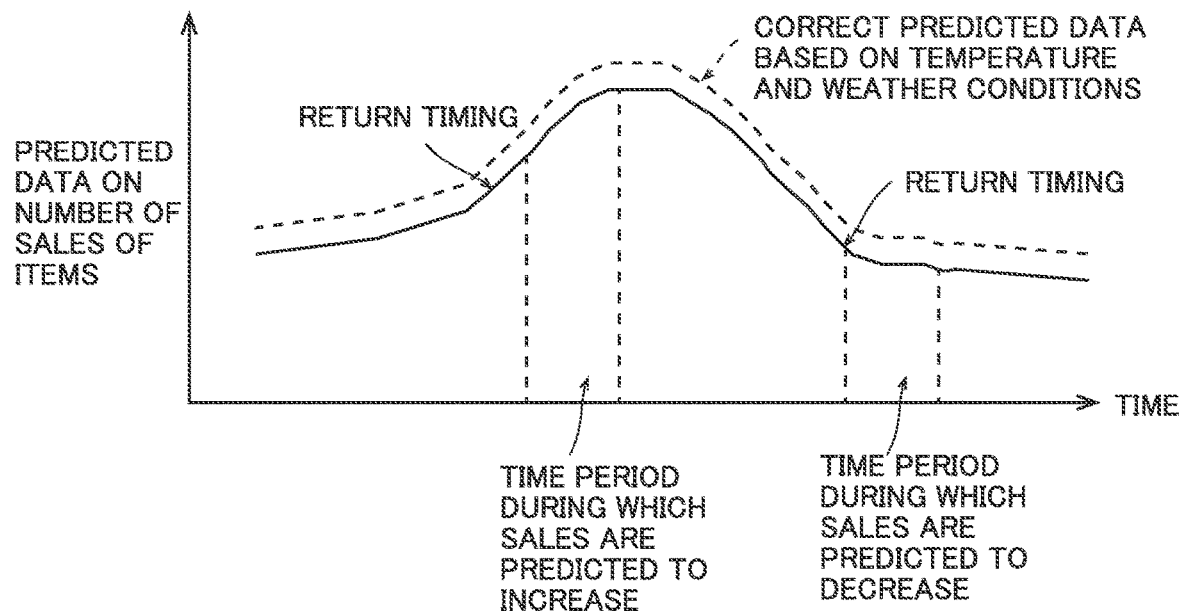
FIG. 4 shows a relationship between a number of previous sales of items and timing of return of the mobile shop.

Processor 101 also estimates a well-selling time of the plurality of items 10a using history information on previous sales of the plurality of items 10a. Specifically, server 100 (processor 101) acquires, through communication unit 103, predicted data on the sales of items 10a (FIG. 4) generated by sales management unit 17 of mobile shop 10. The predicted data shown in FIG. 4 is data generated based on a progression of the number of sales of items 10a on a previous business day. The data shown in FIG. 4 may be the progression itself of the number of sales of items 10a in the past (for example, yesterday).

Processor 101 uses the data shown in FIG. 4 to estimate a time period during which the sales of items 10a are predicted to increase (a well-selling time) and a time period during which the sales of items 10a are predicted to decrease (a time period which is not the well-selling time). For example, processor 101 predicts that the sales of items 10a will increase when a rate of change in the predicted number of sales of items 10a per unit time is greater than a predetermined positive value. Processor 101 also predicts that the sales of items 10a will decrease when the rate of change in the predicted number of sales of items 10a per unit time is smaller than a predetermined negative value.

Processor 101 commands mobile shop 10 to return to EVSE 20 at a time preceding, by a predetermined time (for example, by 30 minutes), the time period during which the sales of items 10a are predicted to increase. The predetermined time may be varied depending on the distance between mobile shop 10 and EVSE 20. In this way, mobile shop 10 can move to EVSE 20 and complete the charging of battery 14 by the time period during which the sales of items 10a are predicted to increase.

Processor 101 also commands mobile shop 10 to return to EVSE 20 upon entering the time period during which the sales of items 10a are predicted to decrease. In this way, mobile shop 10 can be moved to EVSE 20 and battery 14 can be charged in the time period during which the sales of items 10a are predicted to decrease. Note that mobile shop 10 may be commanded to return to EVSE 20 at a time preceding, by a predetermined time, the time period during which the sales of items 10a are predicted to decrease.

Note that the data shown in FIG. 4 may be corrected based on the current air temperature and weather conditions. For example, sales of beverages and the like are expected to increase when the current air temperature is relatively high. In this case, the predicted data may be corrected in a positive direction (in a direction in which the sales increase). In this way, battery 14 can be charged at an appropriate timing even with fluctuations in sales due to changes in air temperature and weather conditions.

Processor 101 also sets the charging schedule for battery 14 using, in addition to the selling situation, information on air temperature at a destination of mobile shop 10. Server 100 (processor 101) acquires, through communication unit 103, air temperature data acquired by air temperature sensor 18 of mobile shop 10 (see FIG. 5). The data shown in FIG. 5 is data indicating a progression of outside air temperature on the current business day.

Figure 5:
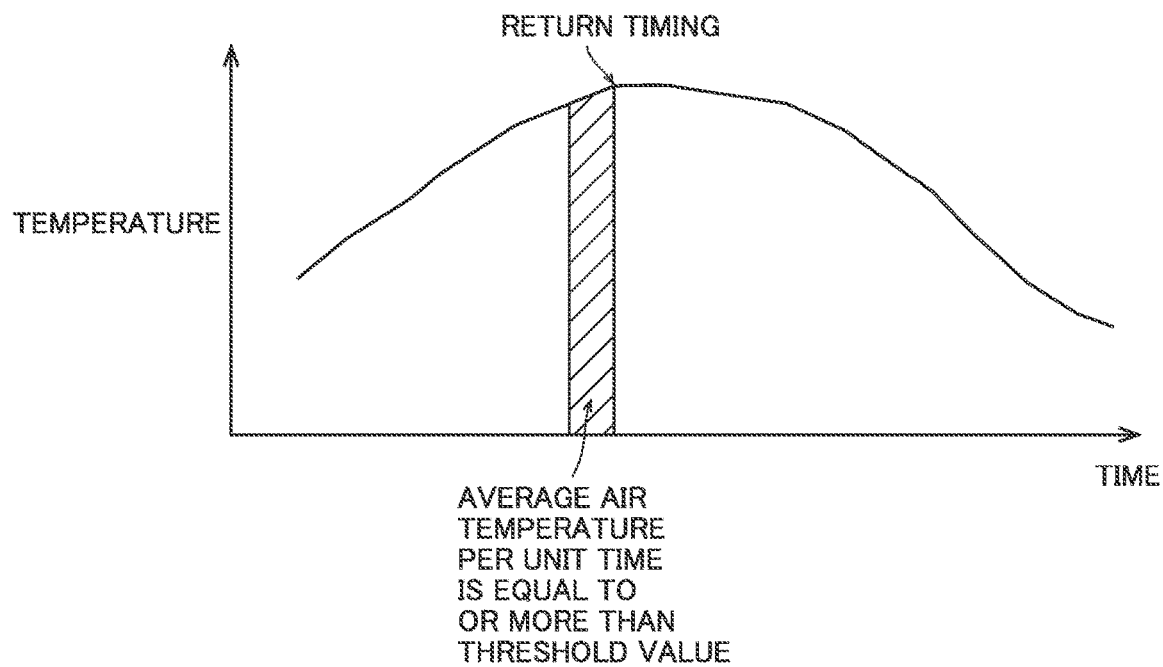
FIG. 5 shows a relationship between current air temperature and timing of return of the mobile shop.

When the most recent average air temperature per unit time (see the shaded area in FIG. 5) exceeds a predetermined threshold value (for example, 30° C.) through use of the data shown in FIG. 5, for example, processor 101 commands mobile shop 10 to return to EVSE 20. In this way, excessive depletion of the SOC of battery 14 due to high air temperatures can be suppressed.

(Sequence of Control System)

Figure 6:
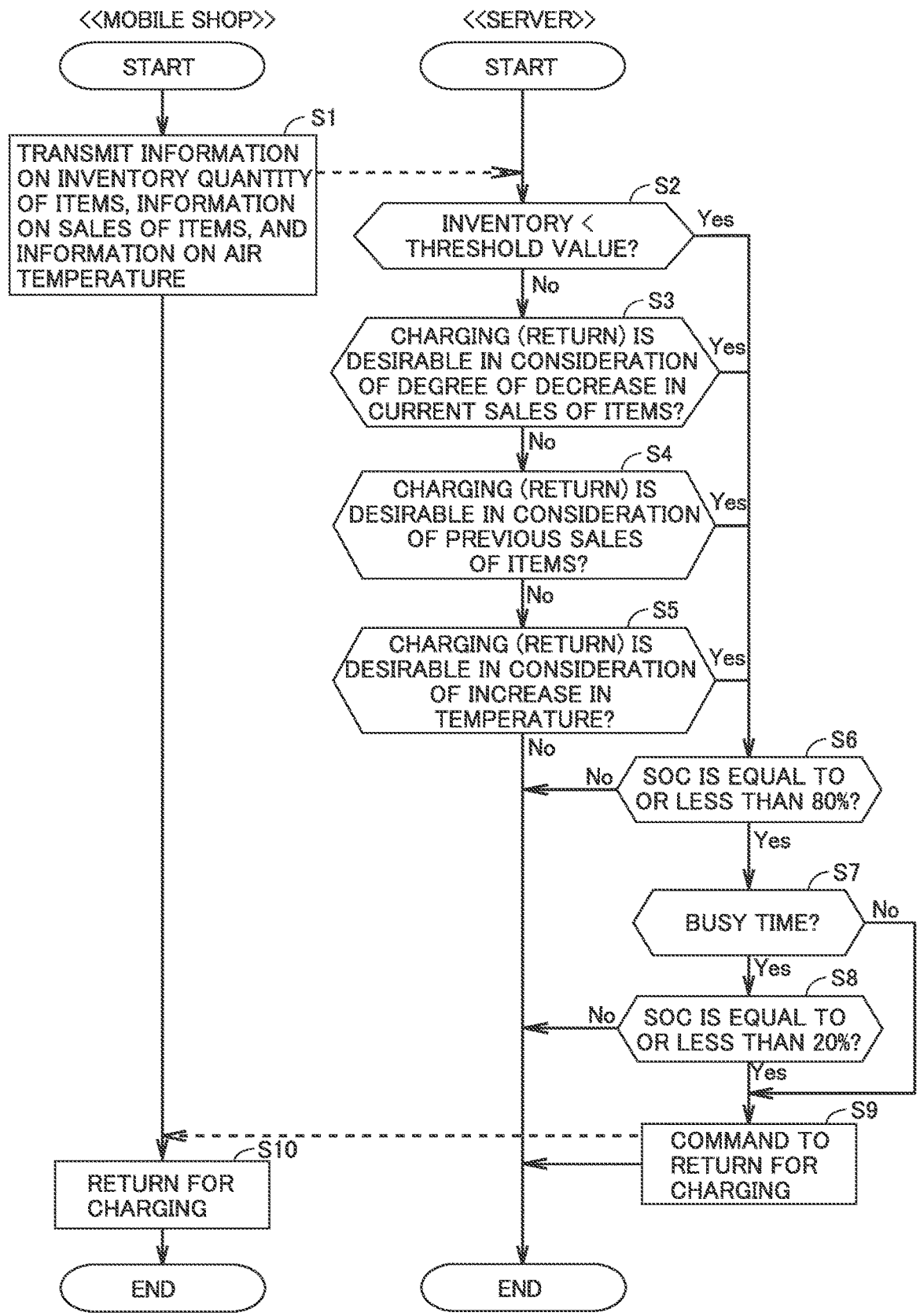
FIG. 6 is a sequence diagram showing sequence control of the control system according to one embodiment.

Referring now to FIG. 6, sequence control of control system 1 will be described. Note that the sequence control shown in FIG. 6 is performed at predetermined time intervals (for example, every ten minutes).

In step S1, ECU 12 of mobile shop 10 performs control of transmitting the information on the inventory quantity of items 10a (see FIG. 2), the information on the sales of items 10a (see FIGS. 3 and 4), and the information on the air temperature (see FIG. 5) to communication unit 103 of server 100 through communication equipment 11.

In step S2, processor 101 determines whether or not the inventory quantity of items 10a has become less than the predetermined quantity (see the dashed line in FIG. 2). When the inventory quantity of items 10a becomes less than the predetermined quantity (Yes in S2), the process proceeds to step S6. When the inventory quantity of items 10a is equal to or more than the predetermined quantity (No in S2), the process proceeds to step S3.

In step S3, processor 101 determines whether or not the charging of battery 14 (the return of mobile shop 10) is desirable in consideration of a degree of decrease in current sales of items 10a. Since the details are as described above (see FIG. 3 and its corresponding description), they will not be repeated. When the charging of battery 14 is desirable (Yes in S3), the process proceeds to step S6. When the charging of battery 14 is not desirable (No in S3), the process proceeds to step S4.

In step S4, processor 101 determines whether or not the charging of battery 14 (the return of mobile shop 10) is desirable in consideration of previous sales of items 10a. Since the details are as described above (see FIG. 4 and its corresponding description), they will not be repeated. When the charging of battery 14 is desirable (Yes in S4), the process proceeds to step S6. When the charging of battery 14 is not desirable (No in S4), the process proceeds to step S5.

In step S5, processor 101 determines whether or not the charging of battery 14 (the return of mobile shop 10) is desirable in consideration of an increase in air temperature. Since the details are as described above (see FIG. 5 and its corresponding description), they will not be repeated. When the charging of battery 14 is desirable (Yes in S5), the process proceeds to step S6. When the charging of battery 14 is not desirable (No in S5), the process ends.

In step S6, processor 101 determines whether or not the SOC of battery 14 is equal to or less than 80%, for example. When the SOC is equal to or less than 80% (Yes in S6), the process proceeds to step S7. When the SOC is more than 80% (No in S6), the process ends. In this way, the charging of battery 14 can be suppressed when the SOC of battery 14 is relatively high (the need for charging is low). Note that the threshold value of the SOC in step S6 may be a value other than 80%.

In step S7, processor 101 determines whether or not mobile shop 10 is busy based on the selling situation. When mobile shop 10 is busy (YES in S7), the process proceeds to step S8. When mobile shop 10 is not busy (NO in S7), the process proceeds to step S9.

For example, processor 101 determines whether or not mobile shop 10 is busy using the information on current sales of items 10*a* that was transmitted from mobile shop 10 in step S1. Specifically, processor 101 determines that the mobile shop is busy when the most recent number of sales of items 10*a* per unit time (see the shaded area in FIG. 3) exceeds a predetermined value. In this case, control is performed such that the charging of battery 14 is regulated (prohibited) regardless of the information on previous sales of items 10*a* or the information on air temperature. Note that the busyness of mobile shop 10 may be determined using the information on previous sales of items 10*a*.

In step S8, processor 101 determines whether or not the SOC of battery 14 is equal to or less than 20%, for example. When the SOC is equal to or less than 20% (Yes in S8), the process proceeds to step S9. When the SOC is more than 20% (No in S8), the process ends. Note that the threshold value of the SOC in step S8 may be a value other than 20%, as long as it is smaller than the threshold value of the SOC in step S6 (80% in the present embodiment).

In step S9, processor 101 transmits a signal, which commands mobile shop 10 to return to EVSE 20 for the charging of battery 14, to communication equipment 11 of mobile shop 10 through communication unit 103.

In step S10, ECU 12 of mobile shop 10 performs control of causing mobile shop 10 to automatically travel to EVSE 20 based on the command to return to EVSE 20. Note that ECU 12 may perform control of causing a display unit (not shown) of mobile shop 10 to display information indicating the command to return to EVSE 20.

As has been described, in the embodiment above, processor 101 performs control of setting the charging schedule for battery 14 based on the selling situation of the plurality of items 10*a*, and causing mobile shop 10 to move to EVSE 20 according to the charging schedule. In this way, mobile shop 10 can be returned to EVSE 20 for the charging of battery 14 at a timing suitable for the selling of items 10*a*. As a result, the loss of opportunities to sell items 10*a* during the return of mobile shop 10 to EVSE 20 can be suppressed.

Although the charging schedule for battery 14 is set based on the air temperature on the current business day in the example of the embodiment described above, the present disclosure is not limited to this. The charging schedule for battery 14 may be set based on a history of air temperature on a previous business day.

Although the charging schedule for battery 14 is set in consideration of an increase in air temperature in the example of the embodiment described above, the present disclosure is not limited to this. The charging schedule for battery 14 may be set in consideration of a decrease in air temperature.

Although the charging schedule for battery 14 is set using the information on the inventory quantity of items 10*a*, the information on current sales of items 10*a*, and the information on previous sales of items 10*a* in the example of the embodiment described above, the present disclosure is not limited to this. The charging schedule for battery 14 may be set using some of the information on the inventory quantity of items 10*a*, the information on current sales of items 10*a*, and the information on previous sales of items 10*a*.

Although server 100, which is provided separately from mobile shop 10, performs the control of setting the charging schedule for battery 14 and the like in the example of the embodiment described above, the present disclosure is not limited to this. A control device provided in the mobile shop may perform the control.

Although the control of setting the charging schedule for battery 14 and the like is performed based on the information on air temperature acquired by air temperature sensor 18 provided in mobile shop 10 in the example of the embodiment described above, the present disclosure is not limited to this. The charging schedule for battery 14 may be set using outside air temperature information acquired through the Internet or the like.

Although an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A method for controlling a mobile shop, the mobile shop having an electrically powered drive source and a secondary battery that supplies electric power to the drive source, and including a plurality of items, the method comprising:
   determining a selling situation of the plurality of items using at least one of information about an inventory status of the plurality of items and information about a well-selling time of the plurality of items;
   setting a charging schedule for the secondary battery based on the selling situation; and
   causing the mobile shop to move to a charging facility according to the charging schedule, wherein
   the setting includes setting the charging schedule using, in addition to the selling situation, information on air temperature at a destination of the mobile shop.

2. The method for controlling a mobile shop according to claim 1, wherein
   the determining includes determining whether or not the mobile shop is busy based on the selling situation, and
   the setting includes setting, when it is determined that the mobile shop is busy, the charging schedule such that the secondary battery is not charged until an SOC of the secondary battery becomes less than a predetermined threshold value.

3. The method for controlling a mobile shop according to claim 1, wherein
   the determining includes determining the selling situation using information on an inventory quantity of the plurality of items, and
   the causing includes causing the mobile shop to move to the charging facility when the inventory quantity becomes less than a predetermined quantity.

4. The method for controlling a mobile shop according to claim 1, wherein
the determining includes estimating a well-selling time of the plurality of items using information on current sales of the plurality of items.

5. The method for controlling a mobile shop according to claim 1, wherein
the determining includes estimating a well-selling time of the plurality of items using history information on previous sales of the plurality of items.

6. A device for controlling a mobile shop, the mobile shop having an electrically powered drive source and a secondary battery that supplies electric power to the drive source, and including a plurality of items, the device comprising:
a communication interface that acquires at least one of information about an inventory status of the plurality of items and information about a well-selling time of the plurality of items; and
a control unit that controls the mobile shop, wherein
the control unit performs control of
determining a selling situation of the plurality of items using the at least one of the information about an inventory status of the plurality of items and the information about a well-selling time of the plurality of items,
setting a charging schedule for the secondary battery based on the selling situation, and
causing the mobile shop to move to a charging facility according to the charging schedule, wherein
the setting includes setting the charging schedule using, in addition to the selling situation, information on air temperature at a destination of the mobile shop.

* * * * *